US012480536B2

(12) United States Patent
Ogawa et al.

(10) Patent No.: US 12,480,536 B2
(45) Date of Patent: Nov. 25, 2025

(54) PRESSURE APPLYING DEVICE

(71) Applicant: EAGLE INDUSTRY CO., LTD., Tokyo (JP)

(72) Inventors: Yoshihiro Ogawa, Tokyo (JP); Kuniaki Miyake, Tokyo (JP); Noriyuki Ogawa, Tokyo (JP)

(73) Assignee: EAGLE INDUSTRY CO., LTD., Tokyo (JP)

( * ) Notice: Subject to any disclaimer, the term of this patent is extended or adjusted under 35 U.S.C. 154(b) by 0 days.

(21) Appl. No.: 18/872,725

(22) PCT Filed: Jun. 16, 2023

(86) PCT No.: PCT/JP2023/022372
§ 371 (c)(1),
(2) Date: Dec. 6, 2024

(87) PCT Pub. No.: WO2023/243704
PCT Pub. Date: Dec. 21, 2023

(65) Prior Publication Data

US 2025/0347300 A1 Nov. 13, 2025

(30) Foreign Application Priority Data

Jun. 17, 2022 (JP) ................................ 2022-098429

(51) Int. Cl.
*F15B 15/08* (2006.01)
*F15B 1/04* (2006.01)
(Continued)

(52) U.S. Cl.
CPC .............. *F15B 15/08* (2013.01); *F15B 1/045* (2013.01); *F15B 15/204* (2013.01);
(Continued)

(58) Field of Classification Search
CPC .... F15B 1/045; F15B 1/24; F15B 3/00; F15B 15/08; F15B 15/1461; F15B 15/1471;
(Continued)

(56) References Cited

U.S. PATENT DOCUMENTS 4,122,759 A * 10/1978 Runkel ................ B64C 13/505 92/253
5,623,861 A * 4/1997 Ward .................... F15B 15/225 251/117
(Continued)

FOREIGN PATENT DOCUMENTS

JP 202120224 A 2/2021
WO WO-2024172650 A1 * 8/2024 ............. F15B 7/006

*Primary Examiner* — Michael Leslie
(74) *Attorney, Agent, or Firm* — HAYES SOLOWAY P.C.

(57) ABSTRACT

There is provided a pressure applying device capable of applying pressure to a working object with a substantially constant force through a compact structure. The pressure applying device includes a pressure accumulating portion; a piston including a small-diameter portion inserted into a cylinder portion on a pressure accumulating portion side, and a large-diameter portion disposed close to a working object W; and a tubular body extending from the large-diameter portion to the cylinder portion. A lubricating fluid is held inside the tubular body.

6 Claims, 4 Drawing Sheets

(51) Int. Cl.
*F15B 15/20* (2006.01)
*F15B 15/14* (2006.01)
*F15B 15/24* (2006.01)

(52) U.S. Cl.
CPC ....... *F15B 15/1461* (2013.01); *F15B 15/1471* (2013.01); *F15B 15/24* (2013.01); *F15B 2201/31* (2013.01); *F15B 2201/312* (2013.01); *F15B 2215/30* (2013.01)

(58) Field of Classification Search
CPC ........ F15B 15/19; F15B 15/204; F15B 15/24; F15B 2215/30
See application file for complete search history.

(56) References Cited

U.S. PATENT DOCUMENTS

| | | | | |
|---|---|---|---|---|
| 7,621,364 | B2 * | 11/2009 | Haglund | B60R 21/38<br>180/274 |
| 9,964,124 | B2 * | 5/2018 | Maro | F15B 1/24 |
| 11,493,062 | B1 * | 11/2022 | Andersen | F15B 15/202 |

* cited by examiner

PRESSURE APPLYING DEVICE

TECHNICAL FIELD

The present invention relates to a pressure applying device, for example, a pressure applying device that applies pressure to a working object.

BACKGROUND ART

There is a cylinder device used as a pressure applying device that applies pressure to a working object using the pressure of a fluid, and a piston can apply pressure to the working object by receiving the pressure of the fluid and moving inside a cylinder.

For example, a pressure applying device of Patent Citation 1 includes a cylinder device, a pump, and an accumulator. When a pressurized fluid is supplied to the cylinder device from the pump or the accumulator, a piston moves relative to a cylinder inside the cylinder to apply pressure to a working object.

CITATION LIST

Patent Literature

Patent Citation 1: JP 2021-20224 A (Page 5, FIG. 1)

SUMMARY OF INVENTION

Technical Problem

However, in the pressure applying device of Patent Citation 1, in order to apply a substantially constant applied pressure to the working object, it is necessary to supply an appropriate fluid to the cylinder at any time using the pump and the accumulator, and the size of the pressure applying device is increased, which is a problem.

The present invention has been made in view of such problems, and an object of the present invention is to provide a pressure applying device capable of applying pressure to a working object with a substantially constant force through a compact structure.

Solution to Problem

In order to solve the foregoing problems, a pressure applying device according to the present invention includes a pressure accumulating portion; a piston including a small-diameter portion inserted into a cylinder portion on a pressure accumulating portion side, and a large-diameter portion disposed close to a working object; and a tubular body extending from the large-diameter portion to the cylinder portion, wherein a lubricating fluid is held inside the tubular body. According to the aforesaid feature of the present invention, since the pressure of the pressure accumulating portion acting on the small-diameter portion is dispersed in the large-diameter portion and is transmitted to an object to be acted upon, a change in the pressure applied to the object to be acted upon within the stroke range of the piston can be reduced with a compact structure in which an accumulator, a pump, or the like is not used. Further, the stroke of the piston can be smoothly performed due to the lubricating fluid held inside the tubular body.

It may be preferable that the cylinder portion and the tubular body are slidable on each other. According to this preferable configuration, since the movement of the piston is guided by the small-diameter portion inside the cylinder portion and the tubular body outside the cylinder portion, the stroke of the piston is stabilized.

It may be preferable that a breathing hole is formed at an upper portion of the tubular body. According to this preferable configuration, since an increase or a decrease in the pressure in the tubular body due to the breathing hole when the piston moves can be suppressed, the piston moves smoothly.

It may be preferable that the breathing hole is provided at a position where the breathing hole is not closed when the tubular body is inserted the furthest into the cylinder portion. According to this preferable configuration, the piston moves smoothly throughout the entire stroke of the piston.

It may be preferable that the pressure applying device further includes a movement restricting portion that restricts a movement of the tubular body in an insertion direction. According to this preferable configuration, the movement of the tubular body in the insertion direction is restricted by the movement restricting portion, so that the breathing hole is reliably prevented from being closed.

It may be preferable that the lubricating fluid is held such that a liquid level is at least at a height position of the small-diameter portion when the tubular body is inserted the furthest into the cylinder portion. According to this preferable configuration, since the lubricating fluid is supplied to a gap between the cylinder portion and the small-diameter portion, the piston moves smoothly.

DESCRIPTION OF EMBODIMENTS

Figure 1:
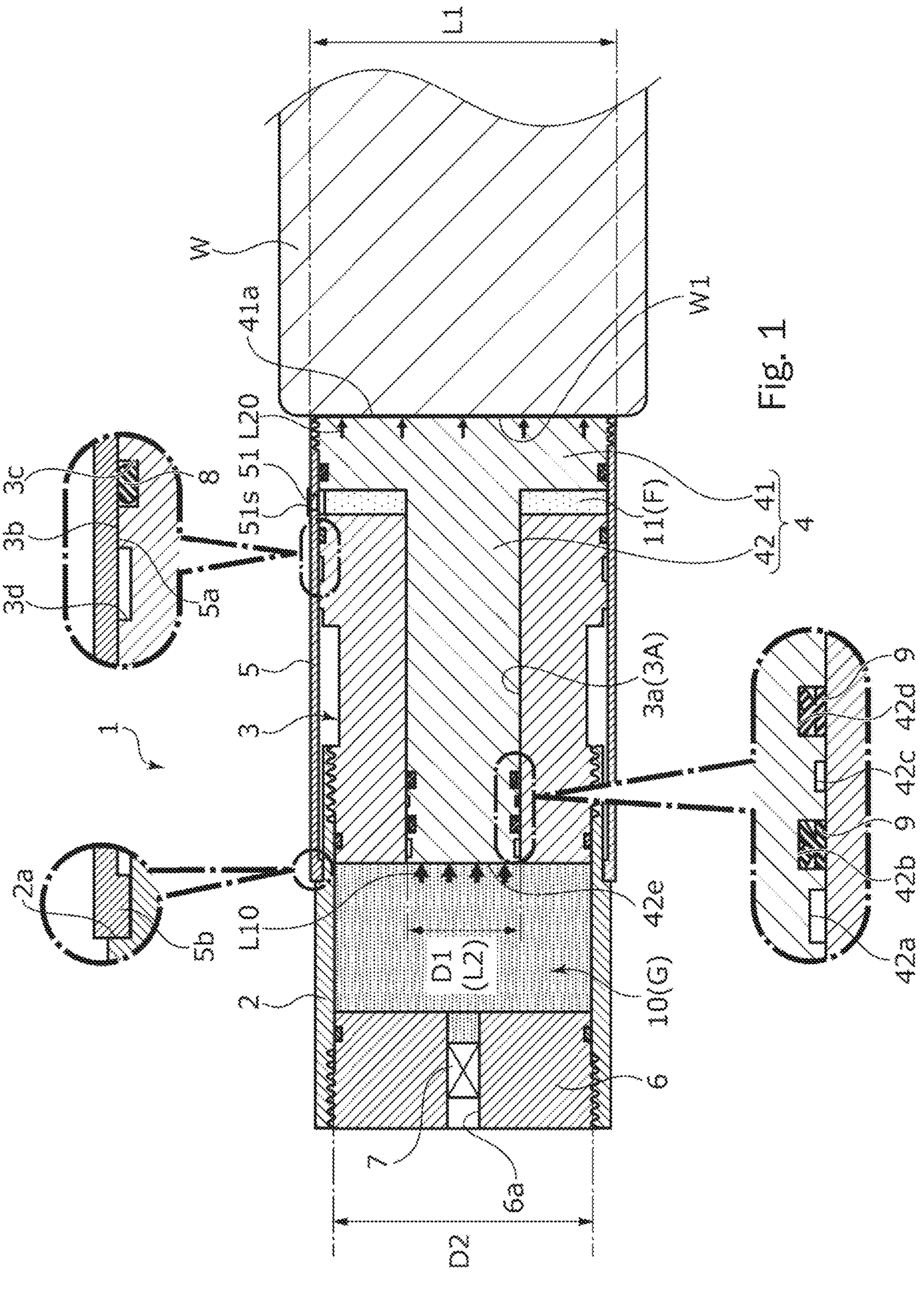
FIG. 1 is a longitudinal sectional view illustrating a contracted state of a pressure applying device according to a first embodiment of the present invention.

Modes for implementing a pressure applying device according to the present invention will be described below based on embodiments.

First Embodiment

A pressure applying device according to a first embodiment of the present invention will be described with reference to FIGS. 1 and 2. Hereinafter, the description will be made based on the assumption that the left side of the drawing sheet of FIG. 1 is a left side of the pressure applying device and the right side of the drawing sheet of FIG. 1 is a right side of the pressure applying device.

As illustrated in FIG. 1, a pressure applying device 1 applies pressure to a working object W using the pressure of a fluid. The description will be made based on the assumption that the working object W of the present embodiment is disposed on the right side of the pressure applying device 1 and the position of a pressure applied surface W1 changes in an axial direction, namely, a left-right direction of the drawing sheet of FIG. 1 depending on the state of use.

The pressure applying device 1 mainly includes a casing 2, a connecting body 3 as a cylinder portion, a piston 4 as a pressure transmitting body, and a tubular body 5 as a guide body.

The casing 2 has a tubular shape. A right end portion of an outer peripheral surface of the casing 2 has a smaller diameter than a left end portion. Namely, a step portion 2*a* serving as a movement restricting portion is formed in an annular shape on the outer peripheral surface of the casing 2.

In addition, a lid member 6 is connected to an inner peripheral surface of the left end portion of the casing 2 in a sealed manner by screwing. A through-hole 6*a* is formed at a central portion of the lid member 6. A plug 7 is attached to the through-hole 6*a*. Incidentally, the casing 2 and the lid member 6 may be integrally formed from the same member.

The connecting body 3 has a stepped tubular shape having a through-hole 3A. A left end portion of the connecting body 3 is screwed and connected to an inner peripheral surface of the right end portion of the casing 2 in a sealed manner. Incidentally, in the present embodiment, a mode in which the casing 2 and the connecting body 3 are separate bodies has been provided as an example; however, the casing 2 and the connecting body 3 may be integrally formed from the same member.

Annular recessed portions 3*c* and 3*d* recessed in a radially inward direction are provided spaced apart from each other in the axial direction on an outer peripheral surface 3*b* of a flange of a right end portion of the connecting body 3, the flange extending in a radially outward direction. A seal ring 8 is fitted and disposed in the annular recessed portion 3*c* on the right side. The annular recessed portion 3*d* on the left side is shallower than the annular recessed portion 3*c*, and the seal ring 8 is not fitted into the annular recessed portion 3*d*.

An O-ring has been described as an example of the seal ring 8; however, the seal ring 8 may be of any type such as an X-ring and a lip seal. In addition, the annular recessed portion 3*d* has an oil reservoir function, and allows smooth sliding. Incidentally, the annular recessed portion 3*d* may be provided at any axial position on the outer peripheral surface 3*b* of the flange as long as the annular recessed portion 3*d* can enhance slidability.

The piston 4 includes a large-diameter portion 41 and a small-diameter portion 42. The large-diameter portion 41 has a disk shape. The small-diameter portion 42 has a columnar shape, and extends from a central portion of the large-diameter portion 41 toward the left side.

A diameter L1 of the large-diameter portion 41 is larger than a diameter L2 of the small-diameter portion 42, and in the present embodiment, is a dimension of approximately three times the diameter L2. Incidentally, the diameter L1 of the large-diameter portion 41 may be larger than the diameter L2 of the small-diameter portion 42, and preferably, the diameter L1 of the large-diameter portion 41 may be a dimension of approximately 2 to 5 times the diameter L2 of the small-diameter portion 42.

The large-diameter portion 41 has a flat end surface 41*a* on the right side. The end surface 41*a* is disposed to be able to come into direct contact with and separate from the working object W. Specifically, the end surface 41*a* comes into surface contact with the pressure applied surface W1 of the working object W. Incidentally, the end surface 41*a* may be stuck to the pressure applied surface W1 of the working object W, and move integrally with the working object W.

The small-diameter portion 42 is inserted and disposed in the through-hole 3A of the connecting body 3 to be slidable on an inner peripheral surface 3*a* of the connecting body 3. Four annular recessed portions 42*a* to 42*d* recessed in the radially inward direction are provided spaced apart from each other in the axial direction on the left side of an outer peripheral surface of the small-diameter portion 42.

The leftmost annular recessed portion 42*a* and the third annular recessed portion 42*c* from the left side are formed to be shallower than the second annular recessed portion 42*b* from the left side and the rightmost annular recessed portion 42*d*. In addition, a seal ring 9 is fitted and disposed in each of the annular recessed portion 42*b* and the annular recessed portion 42*d*. Incidentally, the seal rings 9 are not fitted into the annular recessed portions 42*a* and 42*c*.

An X-ring has been described as an example of the seal ring 9; however, the seal ring 9 may be of any type such as an O-ring and a lip seal. Further, since a plurality of the seal rings 9, specifically, two seal rings 9 are disposed in the axial direction, there is almost no oil leakage to a pressure accumulating portion 10, and the piston 4 is less likely to tilt during movement.

In addition, the annular recessed portions 42*a* and 42*c* have a gas reservoir function and an oil reservoir function, and can prevent gas leakage and allow smooth sliding.

The seal rings 9 are slidable in the axial direction with respect to the inner peripheral surface 3*a* of the connecting body 3, and restrict movement of the fluid in the axial direction.

By inserting the small-diameter portion 42 into the through-hole 3A of the connecting body 3, the pressure accumulating portion 10 is formed on the left side of the pressure applying device 1. Specifically, the pressure accumulating portion 10 is a space surrounded by the casing 2, the connecting body 3, the piston 4, and the lid member 6. The capacity of the pressure accumulating portion 10 changes as the piston 4 moves as will be described later (refer to FIG. 2).

High-pressure gas G from the outside through a gas introduction port (not illustrated) of the plug 7 is sealed in the pressure accumulating portion 10. In other words, the pressure accumulating portion 10 is a cylinder-shaped gas chamber.

A diameter D1 of the through-hole 3A of the connecting body 3 is smaller than a diameter D2 of the pressure accumulating portion 10, and in the present embodiment, is a dimension of approximately ⅓ times the diameter D2 (D1<D2). Incidentally, the diameter D1 of the through-hole 3A may be smaller than the diameter D2 of the pressure accumulating portion 10, and preferably, the diameter D1 of the through-hole 3A is a dimension of approximately ½ to ⅕ times the diameter D2 of the pressure accumulating portion 10.

A right end portion of the tubular body 5 is screwed and connected to an outer peripheral surface of the large-diameter portion 41 in a sealed manner, and the tubular body 5 is integrated with the piston 4. A right end surface of the tubular body 5 is disposed to be substantially flush with the end surface 41*a* on the right side of the large-diameter portion 41 or on the left side with respect to the end surface 41*a*. According to this configuration, the tubular body 5 does not hinder surface contact between the end surface 41*a* of the large-diameter portion 41 and the pressure applied surface W1 of the working object W.

In addition, the tubular body 5 is externally inserted to the connecting body 3, and an inner peripheral surface 5*a* of the tubular body 5 is slidable in the axial direction with respect to the outer peripheral surface 3*b* of the right end portion of the connecting body 3. The seal ring 8 restricts movement of the fluid in the axial direction between the inner peripheral surface 5*a* of the tubular body 5 and the outer peripheral surface 3*b* of the connecting body 3.

A space portion 11 is formed on the right side of the pressure applying device 1 by the connecting body 3, the large-diameter portion 41 of the piston 4, and the tubular body 5. Oil F as a lubricating fluid is held in the space portion 11. The capacity of the space portion 11 changes as the piston 4 moves as will be described later (refer to FIG. 2).

A breathing hole 51 is formed at an upper right portion of the tubular body 5. Namely, the space portion 11 communicates with the external atmospheric space through the breathing hole 51.

In addition, an end portion 5*b* on the left side of the tubular body 5 projects toward a radially inner side. As will be described later, when the piston 4 and the tubular body 5 have moved to a leftmost position, in other words, when the tubular body 5 is inserted the furthest into the connecting body 3, the end portion 5*b* comes into contact with the step portion 2*a* of the casing 2.

Next, the contracted state and the extended state of the pressure applying device 1 will be described using FIGS. 1 and 2. Incidentally, the casing 2 is fixed to a fixed body (not illustrated), and is immovable at least in the axial direction, namely, the left-right direction.

As illustrated in FIG. 1, in a state where the working object W is disposed at the leftmost position, the pressure applying device 1 is in the contracted state where the piston 4 and the tubular body 5 have moved to the leftmost position. When the pressure applying device 1 is in the contracted state, the end portion 5*b* on the left side of the tubular body 5 comes into contact with the step portion 2*a* of the casing 2, and the movement of the piston 4 and the tubular body 5 toward the left side is restricted.

When the pressure applying device 1 is in the contracted state, the capacity of the pressure accumulating portion 10 is at its smallest within the stroke range of the piston 4, and the gas G is in the most compressed state. The movement of the gas G toward the space portion 11 on the right side is restricted by the seal rings 9 and 9. In addition, the annular recessed portions 42*a* and 42*c* function as gas reservoirs, so that the leakage of the gas G can be suppressed.

The pressure of the gas G in the pressure accumulating portion 10 acts on a left surface 42*e* of the small-diameter portion 42 (refer to arrow L10). The pressure of the gas G acting on the left surface 42*e* of the small-diameter portion 42 is transmitted to the working object W, as stress dispersed in the large-diameter portion 41 (refer to arrow L20).

In addition, when the pressure applying device 1 is in the contracted state, the breathing hole 51 of the tubular body 5 is disposed on the right side with respect to the connecting body 3. Namely, the breathing hole 51 is not closed.

Further, a water-repellent ventilation sheet 51*s* is installed to close the breathing hole 51, and allows gas to flow while preventing water from entering the space portion 11 from the outside.

In addition, the liquid level of the oil F is located in the vicinity of a bottom of the breathing hole 51. Accordingly, the oil F is supplied to a gap between the outer peripheral surface of the small-diameter portion 42 of the piston 4 and the inner peripheral surface 3*a* of the connecting body 3, and the oil F does not leak from the breathing hole 51 to the atmospheric space.

Figure 2:
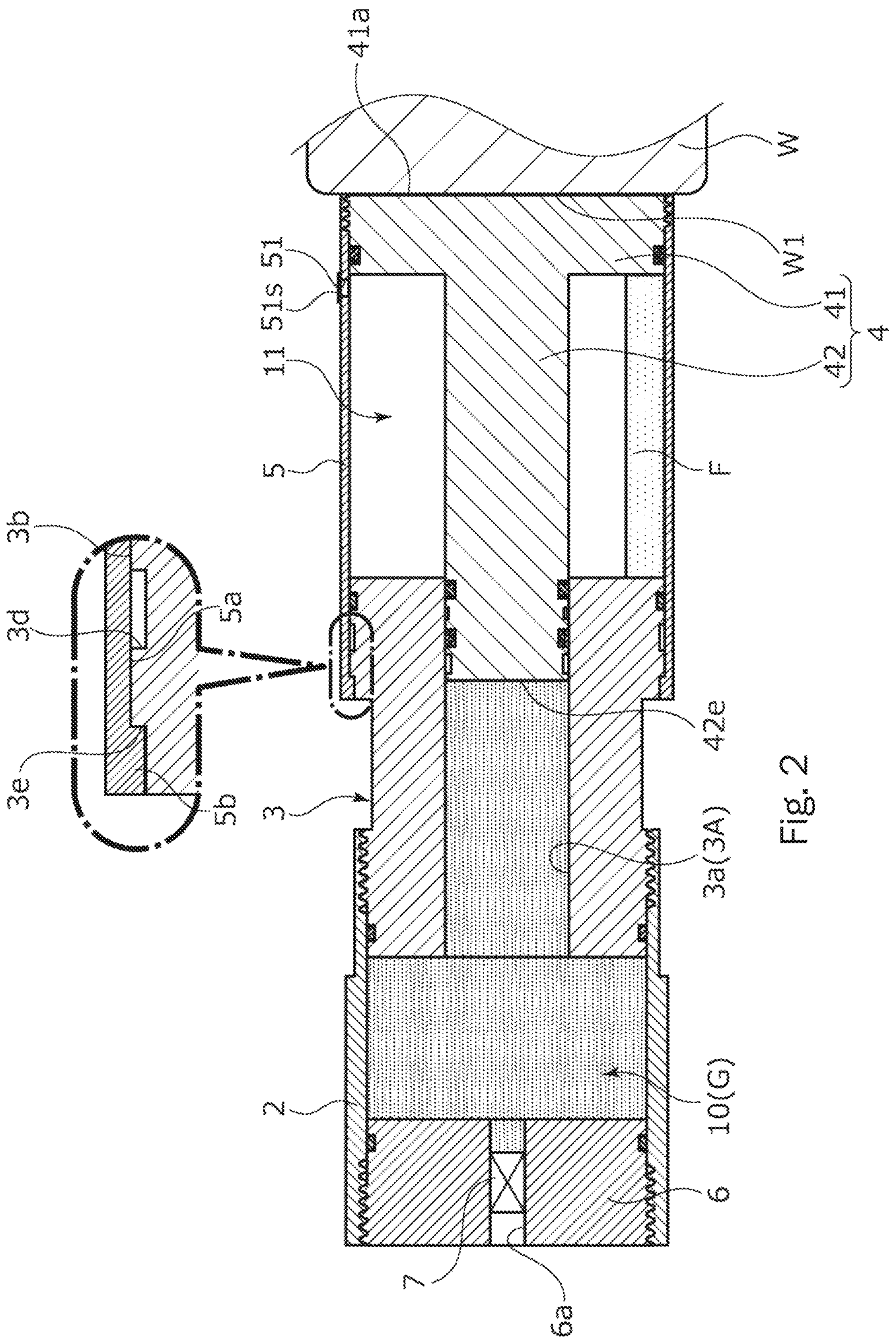
FIG. 2 is a longitudinal sectional view illustrating an extended state of the pressure applying device in the first embodiment.

As illustrated in FIG. 2, in a state where the pressure applied surface W1 of the working object W is disposed at a rightmost position, the pressure applying device 1 is in the extended state where the piston 4 and the tubular body 5 have moved to the rightmost position. When the pressure applying device 1 is in the extended state, the end portion 5*b* on the left side of the tubular body 5 comes into contact with a step portion 3*e* of the connecting body 3, and the movement of the piston 4 and the tubular body 5 toward the right side is restricted.

When the pressure applying device 1 is in the extended state, the capacity of the pressure accumulating portion 10 is at its largest within the stroke range of the piston 4, and the pressure of the gas G has decreased.

In addition, when the pressure applying device 1 is in the extended state, the breathing hole 51 moves in a direction separated from the connecting body 3, namely, toward the right side compared to when the pressure applying device 1 is in the contracted state, so that the breathing hole 51 is not closed. In addition, the liquid level of the oil F is located below the through-hole 3A of the connecting body 3.

A description will be given of when the piston 4 moves toward the right side from the contracted state of the pressure applying device 1 in FIG. 1 to the extended state of the pressure applying device 1 in FIG. 2. Since the diameter D1 of the through-hole 3A of the connecting body 3 is smaller than the diameter D2 of the pressure accumulating portion 10, the pressure of the gas G is prevented from decreasing rapidly as the piston 4 moves toward the right side.

In other words, since in addition to the pressure of the gas G decreasing gently as the piston 4 moves toward the right side, the pressure of the gas G is dispersed as small stress in the large-diameter portion 41 and is transmitted to the working object W, a change in the pressure applied to the working object W within the stroke range of the piston 4, namely, a force applied to the working object W can be reduced. Therefore, pressure can be applied to the working object W with a substantially constant force within the stroke range of the piston 4 without supplying the fluid from the outside using an accumulator, a pump, or the like, so that the pressure applying device 1 can be compactly configured. Namely, since the diameter L2 is smaller than the diameter L1 in the piston 4 having a stepped shape, and the pressure of the small-diameter portion 42 is a high pressure, does not change significantly, and is maintained at a high pressure, the required capacity of the pressure accumulating portion 10 can be made smaller than, for example, when the piston has the same single diameter and the gas G is at a low pressure (the same pressure as in the space portion 11 or the like).

In addition, the stroke of the piston 4 becomes smooth due to the oil F supplied to the gap between the outer peripheral surface of the small-diameter portion 42 of the piston 4 and the inner peripheral surface 3*a* of the connecting body 3. Incidentally, some of the oil F remaining in the gap between the outer peripheral surface of the small-diameter portion 42 and the inner peripheral surface 3*a* of the connecting body 3 flows into the annular recessed portions 42*a* and 42*c*, and contributes to lubricity of the stroke of the piston 4.

In addition, the oil F in the space portion 11 enters a gap between the outer peripheral surface 3*b* of the connecting body 3 and the inner peripheral surface 5*a* of the tubular body 5 when the tubular body 5 moves toward the left side as will be described later, and the movement of the tubular body 5 becomes smooth due to the oil F remaining in the gap.

In addition, since the piston 4 is guided in a movement direction by the small-diameter portion 42 inside the connecting body 3 and the tubular body 5 outside the connecting body 3, the stroke of the piston 4 is stabilized. According to this configuration, in a state where the end surface 41*a* of the large-diameter portion 41 is in surface contact with the pressure applied surface W1 of the working object W, pressure can be applied to the working object W straight toward the right side by the piston 4, so that the working object W can be smoothly deformed or moved.

In addition, when the piston 4 moves toward the left side from the extended state of the pressure applying device 1 in FIG. 2 toward the contracted state of the pressure applying device 1 in FIG. 1, as the piston 4 moves toward the left side, the capacity of the pressure accumulating portion 10 decreases, namely, the pressure of the gas G increases according to the product of an area of the left surface 42*e* of the small-diameter portion 42 and a movement distance of the piston 4.

When stress acting on the end surface 41*a* of the large-diameter portion 41 from the working object W becomes larger than in the state of FIG. 2, the pressure of the gas G increases as the piston 4 moves toward the left side, so that a force pushing the piston 4 toward the right side and a force pushing the piston 4 toward the left side are balanced. Namely, the stroke amount of the piston 4 can be secured without discharging the gas G to the outside.

In addition, the stroke of the piston 4 can be smoothly performed due to the oil F remaining in the gap between the outer peripheral surface of the small-diameter portion 42 and the inner peripheral surface 3*a* of the connecting body 3.

In addition, when the capacity of the space portion 11 decreases gradually and the liquid level of the oil F reaches the through-hole 3A of the connecting body 3, the oil F is supplied to the gap between the outer peripheral surface of the small-diameter portion 42 of the piston 4 and the inner peripheral surface 3*a* of the connecting body 3.

In addition, the oil F in the space portion 11 enters the gap between the outer peripheral surface 3*b* of the connecting body 3 and the inner peripheral surface 5*a* of the tubular body 5, and the movement of the tubular body 5 also becomes smooth. Some of the oil F remaining in the gap between the outer peripheral surface 3*b* of the connecting body 3 and the inner peripheral surface 5*a* of the tubular body 5 flows into the annular recessed portion 3*d*, and contributes to the lubricity of the stroke of the tubular body 5.

In addition, since the breathing hole 51 is not closed throughout the entire stroke of the piston 4, the pressure in the space portion 11 can be prevented from increasing, and the piston 4 can be stably stroked.

As described above, since the pressure of the pressure accumulating portion 10 acting on the small-diameter portion 42 is dispersed in the large-diameter portion 41 and is transmitted to the working object W, a change in the pressure applied to the working object W within the stroke range of the piston 4 can be reduced with a compact structure in which an accumulator, a pump, or the like is not used. Further, the oil F is held in the space portion 11 inside the tubular body 5, and the stroke of the piston 4 can be smoothly performed due to the oil F.

In addition, the tubular body 5 is slidable with respect to the outer peripheral surface 3*b* of the connecting body 3. According to this configuration, since the piston 4 is guided in the movement direction by the small-diameter portion 42 inside the connecting body 3 and the tubular body 5 outside the connecting body 3, the stroke of the piston 4 is stabilized.

In addition, the breathing hole 51 is formed at an upper portion of the tubular body 5. According to this configuration, since an increase or a decrease in the pressure in the space portion 11 due to the breathing hole 51 when the piston 4 moves can be suppressed, the piston 4 moves smoothly.

In addition, the breathing hole 51 is provided at a position where the breathing hole 51 is not closed when the tubular body 5 is inserted the furthest into the connecting body 3. According to this configuration, since the breathing hole 51 is not closed throughout the entire stroke of the piston 4, the pressure in the space portion 11 can be prevented from increasing due to the stroke of the piston 4.

In addition, when the tubular body 5 is inserted the furthest into the connecting body 3, the tubular body 5 comes into contact with the step portion 2*a* of the casing 2, and the movement of the tubular body 5 in an insertion direction is restricted, so that the breathing hole 51 is reliably prevented from being closed.

In addition, the oil F is held such that the liquid level of the oil F is at least at the height position of the small-diameter portion 42 when the tubular body 5 is inserted the furthest into the connecting body 3. According to this configuration, since the oil F is supplied to the gap between the connecting body 3 and the small-diameter portion 42, the piston 4 moves smoothly.

In addition, since the tubular body 5 is attached to the large-diameter portion 41, and extends parallel to the small-diameter portion 42 toward the left side, the pressure applying device 1 is short in total length and is compact.

Second Embodiment

A pressure applying device according to a second embodiment of the present invention will be described with reference to FIGS. 3 and 4. Incidentally, the description of configurations that are the same as and overlap with the configurations of the first embodiment will be omitted.

Figure 3:
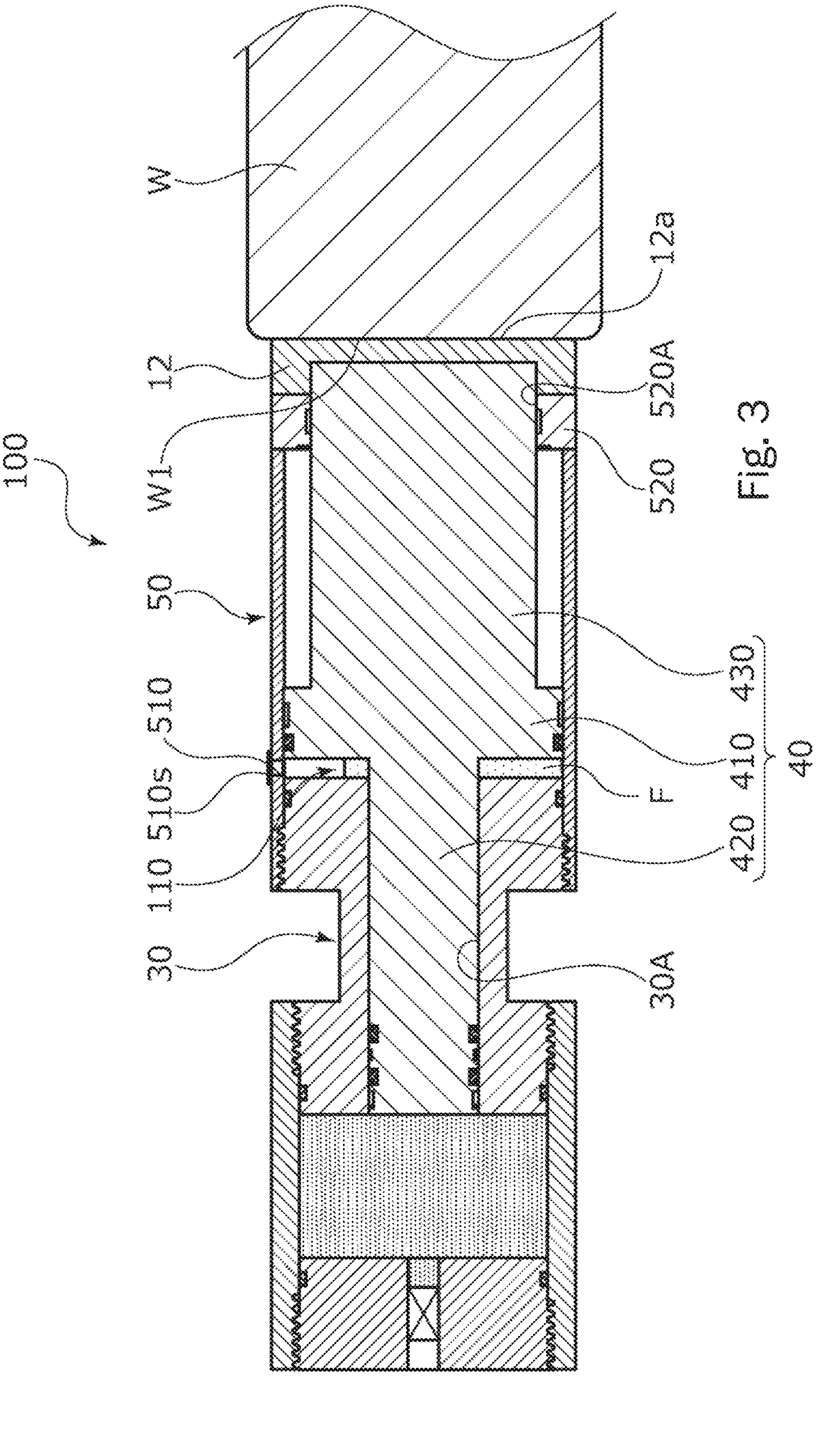
FIG. 3 is a longitudinal sectional view illustrating a contracted state of a pressure applying device according to a second embodiment of the present invention.

As illustrated in FIG. 3, in a pressure applying device 100 of the second embodiment, a left end portion of a tubular body 50 is connected to a right end portion of a connecting body 30 in a sealed manner by screwing. Incidentally, the connecting body 30 and the tubular body 50 may be integrally formed from the same member.

A breathing hole 510 of the tubular body 50 is provided at an upper left portion of the tubular body 50, and is closed by a water-repellent ventilation sheet 510*s*. In addition, a lid body 520 having an annular shape is attached to a right end portion of the tubular body 50.

A piston 40 includes a large-diameter portion 410, a small-diameter portion 420, and a medium-diameter portion 430. The medium-diameter portion 430 has a columnar shape, and extends from a central portion of the large-diameter portion 410 toward the right side. The medium-diameter portion 430 has a smaller diameter than the large-diameter portion 410, and has a larger diameter than the small-diameter portion 420.

The medium-diameter portion 430 is inserted into a through-hole 520A of the lid body 520. A right end portion of the medium-diameter portion 430 is disposed at a right position with respect to the lid body 520, and a locking member 12 having a U shape in a cross-sectional view and serving as a movement restricting portion is fitted and fixed to the right end portion.

A flat right surface 12*a* of the locking member 12 is in surface contact with the pressure applied surface W1 of the working object W.

When the pressure applying device 100 is in a contracted state illustrated in FIG. 3, the locking member 12 comes into contact with the lid body 520, and the movement of the piston 40 toward the left side is restricted.

In addition, the breathing hole 510 of the tubular body 50 is disposed on the left side with respect to the large-diameter portion 410 of the piston 40.

In addition, since the liquid level of the oil F is located above a through-hole 30A of the connecting body 30, the oil F can be supplied to a gap between the small-diameter portion 420 and the connecting body 30.

Figure 4:
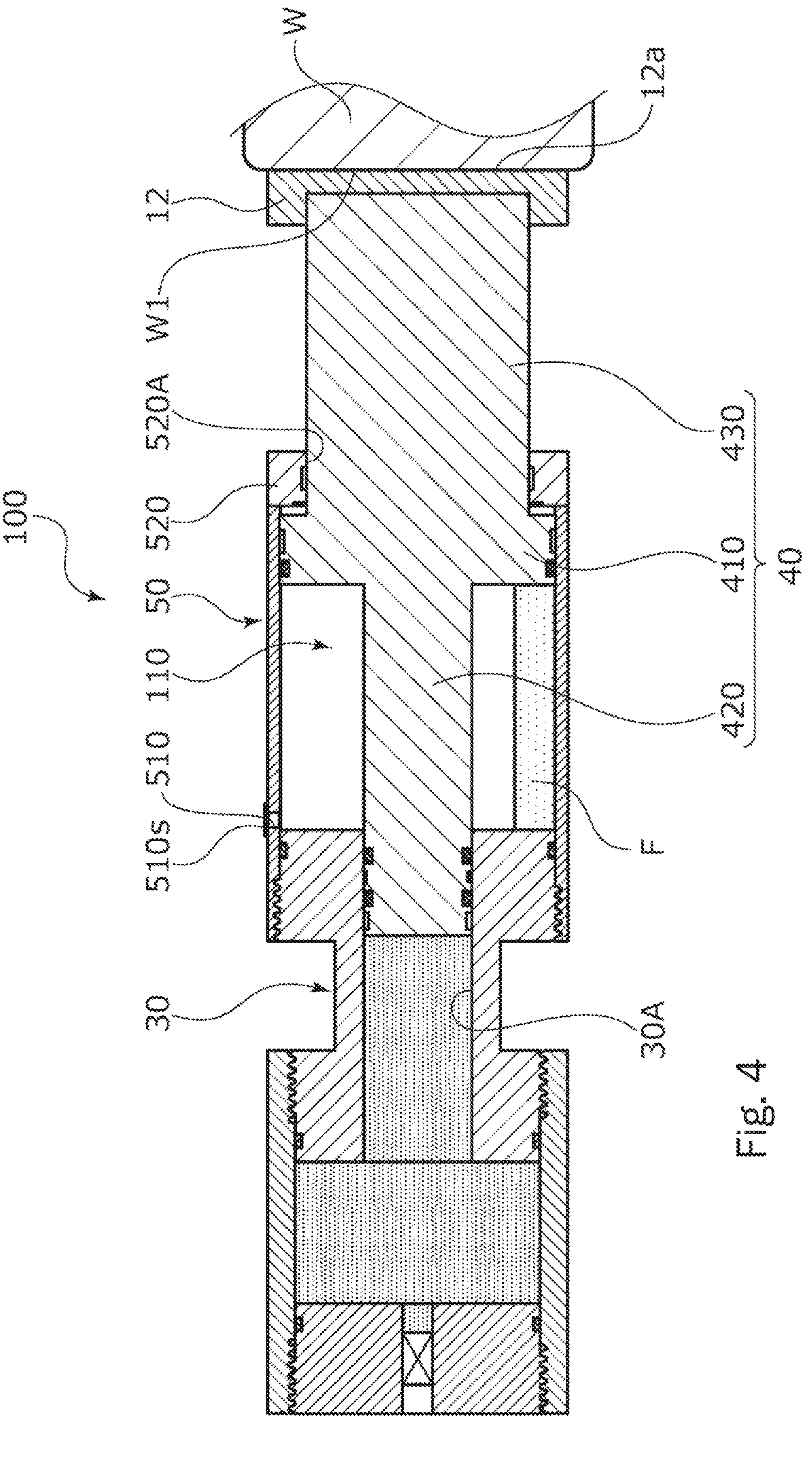
FIG. 4 is a longitudinal sectional view illustrating an extended state of the pressure applying device in the second embodiment.

When the pressure applying device 100 is in an extended state illustrated in FIG. 4, the piston 40 moves toward the right side compared to when the pressure applying device 100 is in the contracted state, so that the breathing hole 510 is not closed by the large-diameter portion 410 of the piston 40.

Namely, since the breathing hole 510 is not closed throughout the entire stroke of the piston 40, the pressure in a space portion 110 can be prevented from increasing due to the stroke of the piston 40.

In addition, when the piston 40 moves leftward and rightward, the oil F enters a gap between an inner peripheral surface of the tubular body 50 and an outer peripheral surface of the large-diameter portion 410, so that the stroke of the piston 40 can be smoothly performed.

The embodiments of the present invention have been described above with reference to the drawings; however, the specific configurations are not limited to the embodiments, and changes or additions that are made without departing from the scope of the present invention are included in the present invention.

In addition, in the first and second embodiments, a mode in which the gas is pressurized and accumulated in the pressure accumulating portion has been provided as an example; however, a liquid such as oil or a mixture of a liquid and a gas may be sealed in the pressure accumulating portion.

In addition, in the first and second embodiments, a mode in which the stroke of the piston is guided by the tubular body and the small-diameter portion has been provided as an example; however, the present invention is not limited thereto, and a separate guide body other than the tubular body and the small-diameter portion may be provided. For example, the stroke of the piston may be guided by providing a guide hole in the cylinder portion, providing a guide pin in the piston, and sliding the guide hole and the guide pin in a stroke direction. Further, an example in which the tubular body is guided by an outer periphery of the casing of the pressure accumulating portion has been described; however, the tubular body may be guided by an outer periphery of the connecting body.

In addition, in the first and second embodiments, the large-diameter portion of the piston is in direct contact with the working object; however, a separate member may be interposed between the large-diameter portion of the piston and the working object.

In addition, in the first and second embodiments, a mode in which the breathing holes 51 and 510 are provided in the tubular bodies 5 and 50, respectively, has been provided as an example; however, the breathing holes 51 and 510 may not be provided, and in addition to a change in the pressure of the pressure accumulating portion 10, a change in the pressure of the space portion 11 may also be used.

In addition, in the first and second embodiments, a mode in which the annular recessed portion 3*d* and the annular recessed portions 42*a* and 42*c* are fluid reservoir spaces has been provided as an example; however, a component having a bearing function, a component that enhances lubricity, and a component that suppresses eccentricity may be inserted into the spaces.

REFERENCE SIGNS LIST

1 Pressure applying device
2*a* Step portion (movement restricting portion)
3 Connecting body (cylinder portion)
4 Piston (pressure transmitting body)
5 Tubular body
10 Pressure accumulating portion
11 Space portion
12 Locking member (movement restricting portion)
30 Connecting body (cylinder portion)
40 Piston (pressure transmitting body)
41 Large-diameter portion
42 Small-diameter portion
50 Tubular body
51 Breathing hole
100 Pressure applying device
110 Space portion
410 Large-diameter portion
420 Small-diameter portion
430 Medium-diameter portion
510 Breathing hole
F Oil
G Gas
W Working object

The invention claimed is:

1. A pressure applying device, comprising:
a pressure accumulating portion;
a piston including a small-diameter portion inserted into a cylinder portion on a pressure accumulating portion side, and a large-diameter portion disposed close to a working object; and
a tubular body extending from the large-diameter portion to the cylinder portion,
wherein a lubricating fluid is held inside the tubular body.

2. The pressure applying device according to claim 1,
wherein the cylinder portion and the tubular body are slidable on each other.

3. The pressure applying device according to claim 1,
wherein a breathing hole is formed at an upper portion of the tubular body.

4. The pressure applying device according to claim 3,
wherein the breathing hole is provided at a position where the breathing hole is not closed when the tubular body is inserted the furthest into the cylinder portion.

5. The pressure applying device according to claim 4, further comprising:
a movement restricting portion configured to restrict a movement of the tubular body in an insertion direction.

6. The pressure applying device according to claim 1,
wherein the lubricating fluid is held such that a liquid level is at least at a height position of the small-diameter portion when the tubular body is inserted the furthest into the cylinder portion.

* * * * *